Figure 1:
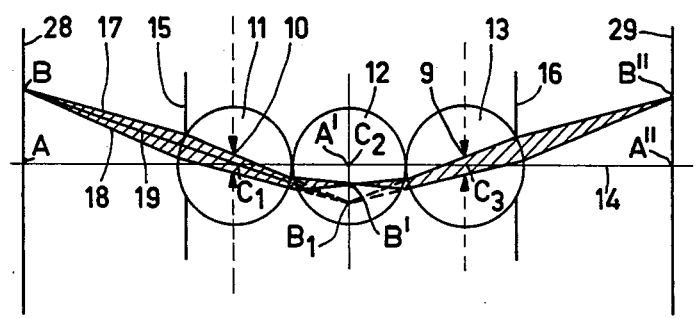

United States Patent [19]

Hunzinger et al.

[11] 4,208,088

[45] Jun. 17, 1980

[54] MULTI-AXIAL OPTICAL OBJECTIVE FOR AN OPTICAL READ HEAD IN A FACSIMILE SYSTEM

[75] Inventors: Jean-Jacques Hunzinger, Paris; Claude Hily, Ozouer-le-Voulgis, both of France

[73] Assignee: U.S. Philips Corporation, New York, N.Y.

[21] Appl. No.: 965,359

[22] Filed: Nov. 30, 1978

[30] Foreign Application Priority Data

Dec. 2, 1977 [FR] France ............................ 77 36340

[51] Int. Cl.$^2$ ............................................. G02B 11/08
[52] U.S. Cl. ............................... 350/31; 350/175 SL; 350/229
[58] Field of Search ................... 350/175 SL, 229, 31, 350/167; 355/50, 46

[56] References Cited

U.S. PATENT DOCUMENTS

| Re. 28,162 | 9/1974 | Anderson | 355/50 |
|---|---|---|---|
| 3,241,438 | 3/1966 | Frank | 355/50 |
| 3,580,675 | 5/1971 | Hieber et al. | 350/167 |
| 4,072,416 | 2/1978 | Waly | 355/46 |

FOREIGN PATENT DOCUMENTS

| 1255342 | 11/1967 | Fed. Rep. of Germany | 350/175 |
|---|---|---|---|
| 2813763 | 10/1978 | Fed. Rep. of Germany | 350/167 |

*Primary Examiner*—Jon W. Henry
*Attorney, Agent, or Firm*—Thomas A. Briody; William J. Streeter; Simon L. Cohen

[57] ABSTRACT

A multi-axial objective, comprising a number of adjacently arranged elementary systems which are formed by three spheres, the centers of which are situated on the same line, said systems being symmetrically arranged with respect to the center of the central sphere. The refractive index of the central sphere is larger than the refractive index of the outer spheres. The entrance and the exit of each system are adjoined by windows which form an entrance pupil and an exit pupil, the former being arranged in the center of the entrance sphere, while the latter is arranged in the center of the exit sphere. The windows are proportioned with respect to the diameter of the spheres so that the field of each system overlaps the field of the directly adjoining systems, the field image of the multi-axial objective being uniformly illuminated.

8 Claims, 3 Drawing Figures

MULTI-AXIAL OPTICAL OBJECTIVE FOR AN OPTICAL READ HEAD IN A FACSIMILE SYSTEM

The invention relates to a multi-axial optical objective which has an elongate shape for forming a line-shaped image and which consists of a number of adjacently arranged mono-axial optical systems whose axes extend parallel to each other.

In accordance with a known technique, adjacently arranged optical fibers are used for realizing objectives of this kind. In optical objectives utilizing optical fibres having a small diameter, each point of the object line requires the use of a fiber whose entrance is illuminated by a luminous flux which is proportional to the brightness of the "point". Part of this luminous flux is transmitted via the fiber and is intercepted by a detector which is coupled only to said fiber. The drawbacks of a system of this kind consist in that the number of fibers must be equal to the number of image points, and in that the document to be "read" must be situated in the vicinity of the entrance of the fibers (distance approximately 0.05 mm), which hampers the illumination of the document and the fibers are liable to be damaged during the passage of the document. Other objectives utilize fibers of larger diameter which form the so-termed "SEL-FOC" lenses. Each lens thus realized is shaped as a glass circular cylinder having a diameter of approximately 1 mm and a length of a few cm. The refractive index of the glass varies from the center of the glass to the circumference thereof. Each of these lenses can produce a real image of a real object with a magnification +1. When the length of the lens is suitably chosen with respect to the refractive index, the useful field is slightly larger than the diameter of a single lens, so that the adjacent arrangement of a plurality of lenses enables further extension of the field without the number of fibers having to be equal to the number of image points. Moreover when lenses of this kind are used, a comparatively large distance (a few millimeters) exists between the document and the fibers. However these lenses also have a number of drawbacks. One of these drawbacks is the complex structure of the lenses which, consequently, are expensive. A further drawback is the small photometric aperture which can be used for each of said lenses when a periodic variation of the illumination level must be avoided in the sensitive image plane, said small aperture limiting the luminous flux on each detector. Another drawback consists in the spread of the optical characteristics of one lens with respect to another lens; this causes differences in the distances between the object and the image, which in its turn causes a variation of the resolution in the image plane.

The invention has for its object to mitigate the drawbacks inherent of prior art optical objectives utilizing optical fibers.

To this end, the device in accordance with the invention is characterized in that each mono-axial optical system is formed by an assembly consisting of three spheres of an optical material, referred to hereinafter as a triplet, the centers of said spheres being situated on one line, said triplet being symmetrical with respect to the center of the central sphere, as regards the geometrical distance, including the object distance and the image distance, as well as regards the optical properties, the refractive index of the central sphere being larger than the refractive index of the outer spheres, the diameter of the central sphere being at the most equal to the diameter of the outer spheres, each triplet being adjoined on its entrance as well as on its exit by a window which determines the limit field y of each triplet, said limit field and the radius R of the outer spheres being related by the further $y = \alpha R$, in which $\alpha$ is a constant which is dependent of the shape of the windows.

The invention will be described in detail hereinafter with reference to the accompanying diagrammatic drawing.

Figure 2:
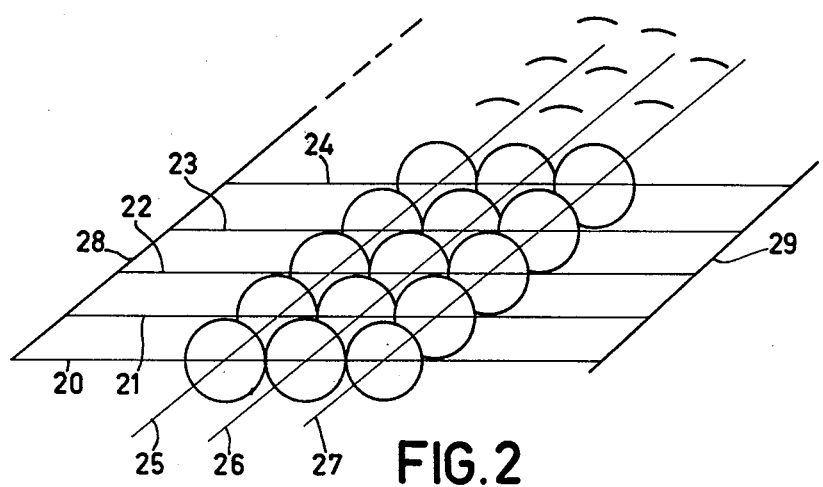
Figure 3:
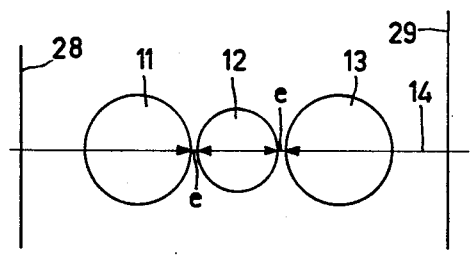

FIG. 1 shows a first embodiment of an elementary optical system which is referred to as a triplet, FIG. 2 is a perspective view of a multi-axial objective in accordance with the invention, and FIG. 3 shows a second embodiment of an elementary optical system.

The reference numerals 11, 12 and 13 in FIG. 1 denote three convex lenses (spheres) of a triplet in accordance with the invention. The entrance lens on the side of the object is denoted by the reference numeral 11, the central lens by the reference numeral 12, and the exit lens on the image side by the reference numeral 13. The centers of said lenses are denoted by the references $C_1$, $C_2$, $C_3$, respectively, and are situated on the axis 14. By way of example, FIG. 1 shows lenses which have the same diameter and which contact each other. As will be explained hereinafter, this is not an absolute requirement. It is merely necessary that the outer spheres have the same dimensions and the same refractive index and are situated at equal distances from the central sphere.

A number of these triplets is assembled such that their axes are parallel (see FIG. 2). In the embodiment shown, said axes 20, 21, 22, 23, 24 are situated in the same plane, so that the object line 28 and the image line 29 are straight lines. The centers of the entrance lens, the central lens and the exit lens are situated on the lines 25, 26, 27, respectively, which are perpendicular to the optical axes of the triplets. In the more general case, where the axes of the triplets are not situated in the same plane, the image line and the object line would be two parallel, curved lines.

In accordance with the invention, in order to enable the overlapping of the image planes of the elementary optical systems so as to limit the number of systems, each triplet has a magnification +1. The lens 11 forms an intermediate image of a segment AB of the object line 28 in the equatorial plane of the central lens 12 which extends perpendicularly to the optical axis 14. This image is shown as $A'B_1$. This is the image which would appear if the lens 12 were absent. Under the influence of the lens 12, actually the image A'B' is formed. On the basis thereof, the lens 13 forms the image A"B" on the image line 29. The line segments AB and A"B" are equal and extend in the same direction. Because the intermediate image $A'B_1$ is situated in the center of the central lens 12, the latter lens acts as a stigmatic, aplanatic lens. Moreover, the lens 12 eliminates the image curvature. In order to insure that the outer spheres 11 and 13 operate without astigmatism, coma and lateral chromatic aberration, the angle of aperture of a useful beam originating from an object point is limited to form a narrow beam whose median ray extends through the center of the first sphere and that of the third sphere. This result is obtained on the one hand due to the fact that the lens 12 couples the centers $C_1$ and $C_3$, thus acting as a field lens, and on the other hand by the introduction of a pupil which limits the angle of aperture of the useful beam. Because this pupil cannot be formed by the opening of an aperture provided in the center of the lens 11, it is realized by way of two windows 15, 16 which symmetrically arranged with respect to the entrance and the exit of the triplet. For the point B of the line segment AB, these windows bound the narrow shaded light beam having a median ray 19 and outer rays 17 and 18, the former ray (17) being tangent to the upper edge of the entrance window 15, while the other one is tangent to the upper edge of the exit window 16. As a result of the presence of windows, the triplet operates, with respect to the point B, with the effective entrance pupil 10 and with the effective exit pupil 9, the first one of which (10) is situated in the center $C_1$ and the other one (9) in the center $C_2$. The effective surface area of the entrance pupil is variable and equal to the "cat's eye" formed by the windows. Said surface area decreases as the angle of the median ray increases. The illumination level of the image field of a triplet, therefore, is not uniform. For a multi-axial objective composed of triplets, a uniform illumination level can be obtained by suitable proportioning of the diameter of the spheres in relation to the largest dimension $AB=y$ (limit field) of the object to be imaged by a single triplet. It has been found that favorable results can be obtained when the relationship between the limit field y and the radius R of the outer spheres is linear: $y=\alpha R$. The constant $\alpha$ depends on the shape of the windows and amounts to approximately 2.3 for circular windows. A deviation of 5% still offers an acceptable homogeneity of the illumination level.

The ultimate proportioning of the multi-axial objective is obtained by determining on the one hand the numerical aperture N of each triplet, which determines the refractive indices n and N of the outer spheres and the central sphere, respectively, and on the other hand of the desired resolution which determines the absolute value of the radius R.

Table 1 below contains a number of numerical examples, the various symbols used having the following meaning:

R: radius of curvature which is in this case the same for the three contacting spheres
n: refractive index of the material of the two outer spheres
N: refractive index of the material of the central sphere
p: paraxial distance between the object and the center of the first sphere, said distance being equal to the distance between the center of the third sphere and the image
y: linear dimension of the field of each triplet, measured from the optical axis
ρ: radius of the window aperture
ω: field angle (object or image)
N: numerical aperture
ta: diameter of the spherical aberration light spot
tc: diameter of the chromatic aberration light spot
t: diameter of the overall aberration light spot The following relationships exist between the above symbols:

$$y = 2.3\, R; \frac{1}{p} + \frac{1}{2R} = \frac{2(n-1)}{nR};$$

$$\rho = \frac{y}{p}\, R;\ tg\omega = \frac{y}{p};$$

$$\nu = \frac{p-R}{2p};\ N = \left[\cos\omega - \tfrac{1}{2}\sqrt{1 - 4\sin^2\omega}\right]^{-1};$$

$$tc = \frac{4R\, \Delta n}{(3n-4)^2}\, \frac{1}{\nu},$$

in which $\Delta n$ is the refractive index of the useful spectrum.

Table 1.

| Characteristics Of Several Multiaxial Lens Arrays | | | | | | | | | |
|---|---|---|---|---|---|---|---|---|---|
| ν | 4 | 4,76 | 5,66 | 6,73 | 8 | 9,51 | 11,3 | 13.45 | 16 |
| P/R | 4,82 | 5,20 | 5,63 | 6,08 | 6,59 | 7,13 | 7,73 | 8,38 | 9,09 |
| ρ/R | 0,48 | 0,44 | 0,41 | 0,38 | 0,35 | 0,32 | 0,30 | 0.27 | 0.25 |
| ω (degrees) | 25,51 | 23,83 | 22,23 | 20,70 | 19,25 | 17,87 | 16,57 | 15,34 | 14.19 |
| n | 1,547 | 1,529 | 1.513 | 1,497 | 1,483 | 1,471 | 1,459 | 1,449 | 1,439 |
| N | 1,542 | 1,612 | 1,670 | 1,719 | 1,760 | 1,795 | 1,826 | 1.851 | 1,874 |
| ta/R | 0.2216 | 0,1721 | 0,1366 | 0,1098 | 0,0890 | 0,0725 | 0,0592 | 0,0485 | 0.0397 |
| tc/R | 0,0194 | 0,0195 | 0,0196 | 0,0196 | 0,0197 | 0,0198 | 0,0199 | 0,0199 | 0,200 |
| t/R | 0,2410 | 0,1916 | 0,1562 | 0,1294 | 0,1087 | 0,0923 | 0,0791 | 0,0684 | 0,0597 |

These results yield the following examples which correspond to an aberration light spot of 0.125 mm which permits a resolution in the order of 8 points per mm.

In the case of a numerical aperture $N=8$ it follows from the column 5 of the table that:
t/R=0.1087, from which it follows that:
2R=2.3 mm
n=1.483
N=1.76
D (distance between the object and the image)=2p+4R=17.18 mm.

For a numerical aperture $N=11.3$, the column 7 provides the following values:
t/R=0.0791, from which it follows that:
2R=3.16,
n=1.459
N=1.826
D=19.46 mm.

These examples demonstrate on the one hand that the spheres in accordance with the invention have dimensions which enable easy manipulation, and on the other hand that the refractive indices of the materials of the spheres correspond to the refractive indices of customary types of glass.

In an alternative embodiment of the invention, only the outer spheres of the triplets have the same diameter 2R, while the diameter 2r of the central sphere is smaller than 2R such that the distance between the outer spheres is slightly (up to 20%) smaller than their diameter. As a result, the distance between the object and the image can be increased, so that the illumination of the document in a read head for facsimile is facilitated. Moreover, it has been found that for the central sphere use can then be made of a type of glass whose refractive index is smaller than stated in the foregoing table, i.e. a more customary and cheaper type of glass may be used.

In the case of a reduced diameter of the central sphere and a reduction of the distance between the outer sphere, moreover, a small air gap can be realized between the central sphere 12 and the neighboring spheres 11 and 13 as shown in FIG. 3, without the operation of the triplet being disturbed. According to this alternative, the values of R, r and e are such that the following inequalities are satisfied:

$$0.8R < r+e \leq R$$

$$0 < e < 0.2r$$

In a further alternative, the windows are formed by rectangles having two sides which are parallel to the object line 28. In this case, the value of $\alpha$ in the formula $y = \alpha R$ approximately equals 2. A deviation of 5% is again permissable. A number of multi-axial objectives as shown in FIG. 2 can be arranged one above the other in layers, so that a number of object lines are coupled to a corresponding number of image lines.

What is claimed is:

1. An improved multi-axial optical objective of the type having an elongate shape for forming a line-shaped image and which consists of a plurality of adjacently arranged mono-axial optical systems whose axes extend parallel to each other, the improvement wherein each mono-axial optical system is formed by an assembly consisting of three spheres of an optical material, referred to hereinafter as a triplet, the centers of said spheres being situated on one line, said triplet being symmetrical with respect to the center of the central sphere, as regards the geometrical distance including the object distance and the image distance, as well as regards the optical properties, the refractive index of the central sphere being larger than the refractive index of the outer spheres, the diameter of the central sphere being at the most equal to the diameter of the outer spheres, each triplet being adjoined on its entrance as well as on its exit by a window which determines the limit field y of each triplet, said field and the radius R of the outer spheres being related by the function $y = \alpha R$, in which $\alpha$ is a constant which is dependent of the shape of the windows.

2. A multi-axial objective as claimed in claim 1, wherein the windows are circular, $\alpha$ being $2.3 \pm 5\%$.

3. A multi-axial objective as claimed in claim 1, wherein the windows are rectangular $\alpha$ being $2 \pm 5\%$.

4. A multi-axial objective as claimed in any of the claims 1, 2 or 3, wherein the spheres contact each other and have the same diameter.

5. A multi-axial objective as claimed in any of the claims 1, 2 or 3, wherein the spheres contact each other, the diameter of the central sphere being smaller than the diameter of the outer spheres.

6. A multi-axial objective as claimed in any of the claims 1, 2 or 3, wherein the spheres do not contact each other, the diameter of the central sphere being smaller than the diameter of the outer spheres.

7. A multi-axial objective as claimed in claim 5 wherein the radius R of the outer spheres, the radius r of the central sphere, and the air gap e between the spheres are subject to the following relations:

$$0.8R < r+e \leq R$$

$$0 < e < 0.2r.$$

8. A multi-axial objective as claimed in claim 6, wherein the radius R of the outer spheres, the radius r of the central sphere, and the air gap e between the spheres are subject to the following relations:

$$0.8R < r+e \leq R$$

$$0 < e < 0.2r.$$

* * * * *